Aug. 21, 1962   R. K. SCHELKE   3,049,946
CHUCK KEY HOLDER AND STRAIN RELIEF
Filed Nov. 27, 1959
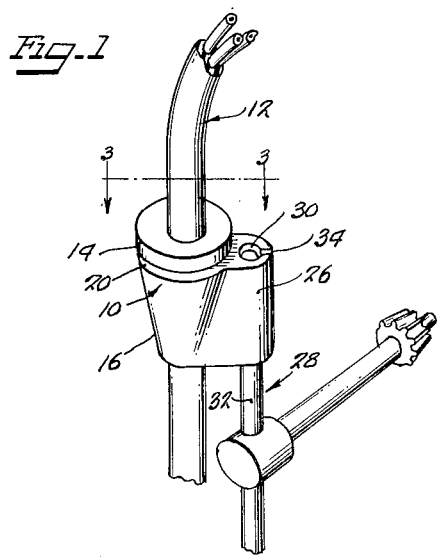
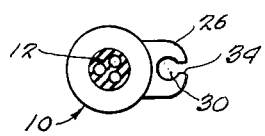
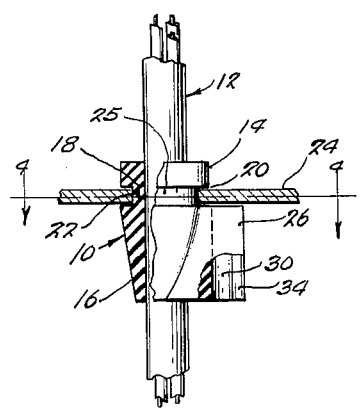
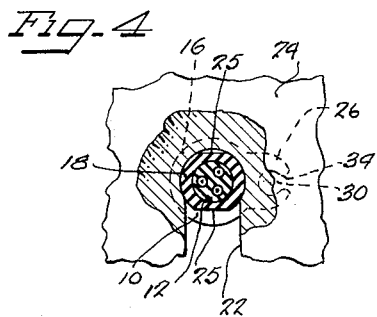
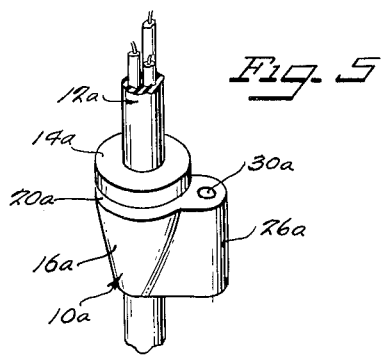
Inventor
ROBERT K SCHELKE
By Soans, Anderson, Luedeka & Fitch
Attys

United States Patent Office 3,049,946
Patented Aug. 21, 1962

3,049,946
CHUCK KEY HOLDER AND STRAIN RELIEF
Robert K. Schelke, Richmond, Ind., assignor to Belden Manufacturing Company, Chicago, Ill., a corporation of Illinois
Filed Nov. 27, 1959, Ser. No. 855,929
2 Claims. (Cl. 77—6)

The present invention relates to strain reliefs which help secure an electrical cord to an associated electrical appliance.

When using an electrical appliance such as a portable power tool it is often desirable to have an accessory, such as a chuck key, conveniently attached to the appliance. Otherwise, the accessory may be lost or be inconvenient to use. It has previously been the practice to the tie certain of the accessories, such as a chuck key, to the electrical cord of the associated appliance with rubber bands or strings. However, tying a chuck key to the power cord has disadvantages in that it is difficult to freely turn the chuck key. Moreover, a chuck key so tied often interferes with the free movement of the power cord over obstacles and/or mars the surface over which it moves.

Accordingly, it is an object of the present invention to provide a novel strain relief for an appliance which is also adapted to receive and hold an accessory. Another object is the provision of a strain relief for receiving and holding an accessory for an appliance, which strain relief is easily connected to the appliance and may be easily disconnected for repair of the appliance. Still another object is the provision of a strain relief for receiving and holding an accessory for an appliance which strain relief is inexpensive and simple to manufacture and connect to the appliance.

Other objects and advantages of the invention will become apparent by reference to the following description and accompanying drawings.

In the drawings:
FIGURE 1 is a perspective view of a strain relief embodying various features of the present invention, and being applied to an electrical cord. A chuck key for a power tool is shown in engagement with the strain relief;
FIGURE 2 is an elevational view of the strain relief shown in FIGURE 1 as utilized with an electrical power tool, portions of the strain relief being broken away to show the internal construction thereof;
FIGURE 3 is a sectional view taken along line 3—3 of FIGURE 1;
FIGURE 4 is a sectional view taken along line 4—4 of FIGURE 2; and
FIGURE 5 is a perspective view of another embodiment of the invention.

Generally, a strain relief in accordance with the present invention is adapted to be mechanically connected to an appliance, such as a portable electrical power tool and is adapted to receive and hold an accessory such as chuck key for the appliance. The strain relief is disposed about and is attached to an electrical cord which provides electrical power for the appliance. The strain relief comprises a body part which is provided at one end with a means which in cooperation with the body part, mechanically connects the strain relief to the appliance. The body part is provided with means for receiving and holding the accessory and for aiding in seating said strain relief on said appliance.

More specifically, the strain relief 10, illustrated in the drawings, is of the bushing or sleeve type and is securely attached to a conventional electrical conductor cord 12. The strain relief 10 can be most conveniently manufactured by molding it directly onto the electrical cord and, to make possible the attainment of all of the advantages of the invention, at least part of the strain relief 10 should be of a resilient, yieldable material. Moldable rubber compounds and plastic compositions similar to those commonly used for molding the bodies of and the like, are suitable for this purpose.

The conductor cord 12 is adapted to provide electrical power for a portable power tool, and, as illustrated, is generally circular in cross section. While the cord 12 is of the three conductor type and is provided with a molded-on plastic insulation, it will be understood that the strain relief of this invention is suitable for use with almost any type of conductor cord. Accordingly, since the specific construction of the conductor cord 12 does not form a part of the present invention, it will not be described in detail.

As shown in the drawings, the strain relief 10 includes a generally cylindrical inner head portion 14 and an outer or body portion 16 which tapers in the direction of the outer end thereof. The head portion 14 is connected to the tapered portion 16 by a connecting portion 18 which is of a smaller cross sectional area than the head portion 14, whereby an annular groove 20 is provided between the head porton 14 and the tapered portion 16.

When the strain relief 10 is attached to a power tool, the connecting portion is bottomed in a slot 22 in a casing wall 24 of the power tool, the head portion 14 being disposed on one side of the wall 24 and the tapered portion 16 being disposed on the other side. Preferably, to prevent an in and out movement on the strain relief 10, the annular groove 20 is made approximately as wide as the thickness of the wall 24.

As shown particularly in FIGURE 4, the connecting portion 18 is made generally circular in cross section and of a slightly larger diameter than the width of the slot 22 in the casing wall 24 of the power tool. The connecting portion 18 is made of this diameter so that when the strain relief 10 is in position on the power tool 24, the connecting portion 18 is indented by the sides of the slot 22 thereby preventing movement of the strain relief 10 in the slot 22.

So that the strain relief 10 may be easily inserted into the slot 22, the connecting portion 18 is truncated on opposite sides (as indicated at 25) to a width slightly less than the width of the slot 22. Thus, the strain relief 10 may be easily inserted into the slot 22 when the truncated side portions of the connecting portion 18 are parallel to the sides of the slot 22. To lock the strain relief 10 in place, the strain relief 10 is turned 90° when the connecting portion 18 is bottomed in the slot 22.

The tapered portion 16 of the strain relief 10 is provided with a means 26 which aids in the seating and insertion of the strain relief and which is also adapted to hold a chuck key 28 for the power tool. In the illustrated embodiment, the means 26 is a projection 26 which extends laterally of the body part 10. The projection 26 is of substantially the same length as the tapered portion 16 and is provided with a flat surface which is in the same plane as the side wall of the groove 20 so as to provide more of a surface to seat on the wall 24 of the power tool. As shown in the drawings, the projection 26 is of approximately the same thickness as the diameter of the smaller end of the tapered portion 16. For purposes of appearance, the outer edge of the projection 26 may be rounded.

Preferably, the projection 26 is extended from the tapered portion 16 in a direction such that the truncated sides 25 of the connecting portion 18 are parallel to the transverse axis of the projection 26. In this way, during assembly of the strain relief to the power tool, the correct relationship between the truncated sides 25 and the sides of the slot 22 may be readily determined. The projection 26 also serves as a means by which to grip the strain relief 10 in order to lock it in position on the power tool 24.

As shown in FIGURES 1 through 4, a generally circular aperture 30 is extended longitudinally through the projection 26 near its outer edge. The aperture 30 is made with a diameter slightly less than the handle rod 32 of the chuck key 28 so that the chuck key 28, when inserted into the aperture 30, is held therein. By providing the projection 26 with a flat surfaced end which, as previously described, abuts the wall 24 of the power tool, the projection 26 is supported when the chuck key 28 is being inserted into the aperture 30. Thus, undesirable bending of the strain relief 10 is prevented.

To enable the chuck key 28 to be easily inserted into the aperture 30, the outer edge of the projection 26 is preferably provided with a slot 34 which extends into the aperture 30. The slot 34 is made of a slightly less width than the diameter of the aperture 30 so that once the handle rod 32 of the chuck key 28 is inserted into the aperture 30, the lips formed by the sides of the slot 34 will clamp and maintain the chuck key 28 in place. Preferably, the edges of the side walls of the slot 34 are rounded, as shown in FIGURE 4, for ease in inserting and removing the chuck key handle rod 32 through the slot 34.

In the embodiment shown in FIGURE 5, wherein similar parts to those in FIGURES 1 through 4 are indicated with the same reference numerals with the subscript "a", a longitudinal slot is not provided by which the chuck key may be inserted sidewise into the holder on the strain relief 10a. In this embodiment, in order to insert the chuck key handle rod, it must be pushed through the aperture 30a. Of course, in this embodiment, for ease of insertion, the aperture 30a may be made larger than the diameter of the aperture in the previously described embodiment and, accordingly, the gripping action of the side walls of the aperture 30a would not be as effective.

From the above, it can be seen that a novel strain relief is provided which is also adapted to receive and hold an accessory for an appliance. The accessory is securely held so that it cannot be lost and yet, the holding is such that it can be easily removed for use. Moreover, the construction of the strain relief is such that it may be easily and quickly connected to an appliance.

Various changes and modifications may be made in the above-described strain relief without departing from the spirit or scope of the invention. For example, while the tool holding portion of the strain reliefs illustrated in the drawings is a continuous body in each instance, it will be apparent that they may be composed of a plurality of separate projections having axially aligned openings therethrough.

Various features of the invention are set forth in the accompanying claims.

I claim:
1. A strain relief adapted for mounting about a power conductor of an electrical appliance and provided with a holder for an accessory used with the appliance; which strain relief comprises an elongated body portion, a projection extending laterally from said body portion, and a head portion; said head portion being joined to said body portion by a connection segment having a smaller cross-sectional area than said body portion and said head portion; said connecting segment being generally cylindrical in cross-section and having oppositely disposed truncated side portions; said projection having an aperture extending longitudinally therethrough for holding the accessory used with the appliance; the longitudinal axis of said aperture being positioned at a predetermined angle relative to the truncated sides of said body portion; said apertured projection having a flat surface lying in the same plane as the surface of said body portion adjacent said connecting segment so that said projection abuts the supporting wall of an appliance adapted with said strain relief and whereby an accessory used with the appliance may be readily inserted and withdrawn from said aperture without imparting undesirable flexing and bending to the power cord of the appliance whereto said strain relief is secured.

2. A strain relief adapted for mounting about a power conductor of an electrical appliance and provided with a holder for an accessory used with the appliance; which strain relief comprises an elongated tapered body portion, a projection extending laterally from said body portion, and a cylindrical head portion; said cylindrical head portion being joined to said body portion by a connecting segment having a smaller cross-sectional area than said body portion and said head portion; said connecting segment being generally cylindrical in cross-section and having oppositely disposed truncated side portions; said projection having an aperture extending longitudinally therethrough for holding the accessory used with the appliance; the longitudinal axis of said aperture lying between and being parallel to the planes defined by the truncated sides of said tapered body portion; said apertured projection having a flat surface lying in the same plane as the surface of said tapered body portion adjacent said connecting segment so that said projection abuts the supporting wall of an appliance adapted with said strain relief and whereby an accessory used with the appliance may be readily inserted and withdrawn from said aperture without imparting undesirable flexing and bending to the power cord of the appliance whereto said strain relief is secured.

References Cited in the file of this patent
UNITED STATES PATENTS

| | | |
|---|---|---|
| 2,115,495 | Mapelsden | Apr. 26, 1938 |
| 2,257,559 | Albertson | Sept. 30, 1941 |
| 2,291,430 | Ingersoll | July 28, 1942 |
| 2,824,651 | Davis | Feb. 25, 1958 |
| 2,941,426 | Muller et al. | June 21, 1960 |

UNITED STATES PATENT OFFICE
CERTIFICATE OF CORRECTION

Patent No. 3,049,946 August 21, 1962

Robert K. Schelke

It is hereby certified that error appears in the above numbered patent requiring correction and that the said Letters Patent should read as corrected below.

Column 2, line 6, after "of" insert -- electrical connector plugs, electrical insulation --.

Signed and sealed this 5th day of February 1963.

(SEAL)
Attest:

ERNEST W. SWIDER
Attesting Officer

DAVID L. LADD
Commissioner of Paten